A. Harrison,
Making Ink.
N° 8,755.  Patented Feb. 24, 1852.
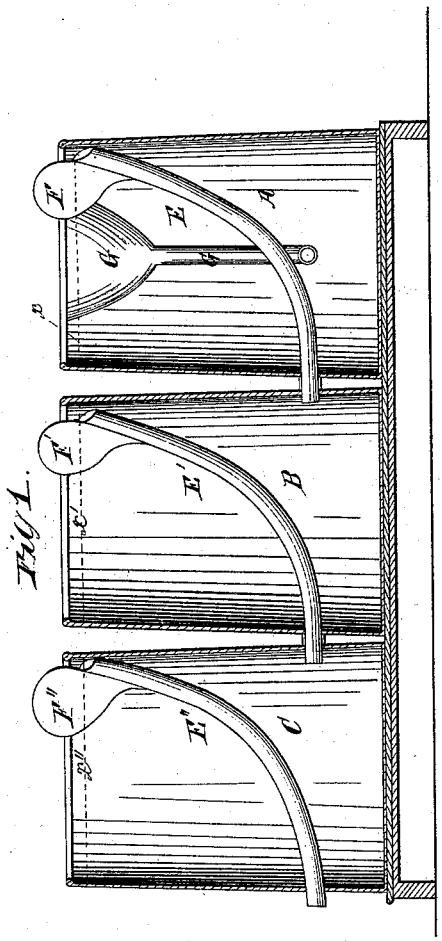
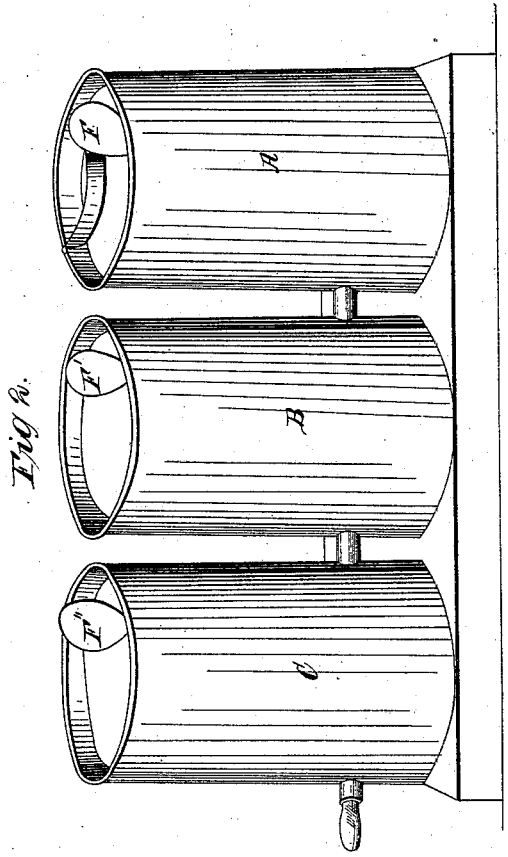

UNITED STATES PATENT OFFICE.

ALEXANDER HARRISON, OF PHILADELPHIA, PENNSYLVANIA.

VESSEL FOR MAKING INK.

Specification of Letters Patent No. 8,755, dated February 24, 1852.

*To all whom it may concern:*

Be it known that I, ALEXANDER HARRISON, of the city and county of Philadelphia and State of Pennsylvania, have invented a new Mode of Combining and Arranging Vessels for Refining and Oxygenating Ink, which I denominate my "Ink Refining and Oxygenating Vessels;" and I do hereby declare that the following is a full, clear, and exact description of the construction and operation of the same, reference being had to the annexed drawing, making a part of this specification.

The nature of my improvement consists in arranging a number of reservoirs or vessels in succession, and so connecting them together that the fluid from the top of the first shall be discharged into the second vessel near its bottom, the fluid from the top of the second, into the third reservoir near its bottom, and so on, thus exposing the entire quantity of ink to the oxygenating action of the atmosphere in each vessel successively; and at the same time drawing off from each cask into the successive one only the purer portions of its contents.

In the accompanying drawings, Figure 1, represents a sectional view of three vessels arranged on my improved plan, and Fig. 2, a perspective view of the same.

The same letters refer to similar parts in each.

A, B, and C, (Figs. 1 and 2,) represent three casks of a series. The ink is first poured into cask A, by a metallic tube, C, and funnel, which tube, extends down nearly to the bottom of the vessel.

The ink is poured in until its level is raised in the cask, A, to the line H. A flexible tube, E, of india rubber, or similar substance is kept suspended by a small floating air-ball or other float, F, so that the upper end of the tube shall always be but a slight distance below the surface of the ink. The tube E passes down through the vessel A and discharges into the vessel B, near its bottom. A second flexible tube E', suspended in the same manner by a float F', just below the level X', of the cask B, conveys the ink down nearly to the bottom of the cask C; and a third flexible tube E'' is suspended near the top of the cask C, by a third float F'', and communicates with the bottom of a fourth cask. In this manner, any desired number of reservoirs may be connected together and formed into a series; the ink in each case discharging from the surface of one into the inferior part of a succeeding vessel.

I prefer to employ in a series, twelve vessels, drawing off the ink at the twelfth vessel from the one into which it is first poured; but a less number of vessels may be found to answer the purpose. The advantages of this arrangement are, that a more perfect oxygenation is secured without waste of ink or expense for labor. It is well known that the perfect manufacture of ink requires that the ink after being compounded should be exposed to an intimate contact with the atmosphere in order that it may be oxygenated. It is also known that the mucilaginous matters and other impurities in the ink, are slightly heavier than the ink, and will gradually deposit.

To secure the perfect oxygenation of the ink, heretofore, the solution has been repeatedly stirred in the open air; but this renders the ink impure by distributing the impurities through it, and does not secure a perfect oxygenation.

My plan as above described secures perfect atmospheric contact, any required number of times in succession—all the vessels being uncovered, and all the ink being compelled to pass to the top of each vessel before it is drawn to the next one in the series. At the same time as the tubes discharge below, all the heavier impurities remain below, and it is the purest part of the ink or that from the top which is carried from each cask to the one next in succession. My mode of connecting together vessels into a series may be also applied, though imperfectly, by employing metallic tubes to connect the upper part of each vessel with the inferior portion of the succeeding one.

What I claim as my invention, and desire to secure by Letters Patent, is—

The arrangement and connecting together a series of vessels for manufacturing ink in the manner, and for the purposes herein set forth.

ALEXANDER HARRISON.

Witnesses:
GEORGE HARDING,
I. E. SHAW.